United States Patent
Fujiwara

(10) Patent No.: US 6,937,762 B2
(45) Date of Patent: Aug. 30, 2005

(54) IMAGE PROCESSING DEVICE AND PROGRAM PRODUCT

(75) Inventor: Yoko Fujiwara, Tokyo (JP)

(73) Assignee: Minolta Co., Ltd., Osaka (JP)

(*) Notice: Subject to any disclaimer, the term of this patent is extended or adjusted under 35 U.S.C. 154(b) by 701 days.

(21) Appl. No.: 09/880,007

(22) Filed: Jun. 14, 2001

(65) Prior Publication Data

US 2001/0055423 A1 Dec. 27, 2001

(30) Foreign Application Priority Data

Jun. 20, 2000 (JP) ........................................ 2000-185267

(51) Int. Cl.⁷ ................................................ G06K 9/18
(52) U.S. Cl. ........................................................ 382/182
(58) Field of Search ................................ 382/181, 182, 382/183, 184; 235/435, 462.01

(56) References Cited

U.S. PATENT DOCUMENTS 5,719,969 A * 2/1998 Taguchi ...................... 382/311
6,721,463 B2 * 4/2004 Naoi et al. .................. 382/305

FOREIGN PATENT DOCUMENTS

| JP | A 05-037700 | 12/1993 |
| JP | A 09-091371 | 4/1997 |
| JP | 9-116720 | * 5/1997 |
| JP | 10-124618 | * 5/1998 |
| JP | A 10-290349 | 10/1998 |
| JP | A 10-313372 | 11/1998 |

* cited by examiner

Primary Examiner—Samir Ahmed
(74) Attorney, Agent, or Firm—Burns, Doane, Swecker & Mathis, L.L.P.

(57) ABSTRACT

When an image group of character images such as a word consists of character images, which are character code data candidates as their character recognition certainties are higher than a prescribed value, and character images, which are character image data candidates as their character recognition certainties are lower than a prescribed value, a computer 10 with a capability of functioning as an image processing device has a character output format judgment unit 33 that makes a judgment to cut out all character images within said word without converting them to character code data to form character image data.

48 Claims, 11 Drawing Sheets

FIG. 1  RELATED ART

Special Offer

Speed up productivity and decrease time-to-market by calling today for your Professional Image Processing Kit and this incredible special offer.

FIG. 2A  RELATED ART

Well-known

FIG. 2B  RELATED ART

*Well-known*

IMAGE PROCESSING DEVICE AND PROGRAM PRODUCT

This application is based on the Japanese Patent Application No. 2000-185267 filed on Jun. 20, 2000, the contents of which are hereby incorporated by reference.

BACKGROUND OF THE INVENTION

1. Field of the Invention

The present invention relates to an image processing device and a program product. In particular, the invention relates to an image processing device and a program product for outputting character images that have low probabilities for being identified of character codes as character image data cut out from the character images without converting them into character code data.

2. Description of the Related Art

Latest image recognition devices can recognize character images as character codes with extremely high accuracies as long as a document is of good scanning conditions (for example if a document is made up of a single font type). However, if the quality of characters on the document is bad, or if the layout such as characters on the document is complicated, the recognition accuracy drops substantially and character image recognition errors occur more frequently.

In order to cope with such a problem, a character recognition device has been proposed wherein the character images that have high probability of recognition errors are outputted as character images (e.g., bitmap type image data) without converting them into character codes. Such an image recognition device eliminates the probability of outputting character codes that do not match with the characters on the document.

However, if only the characters that have high probability of error recognitions are outputted as character image data, it may cause mismatches between the shapes of the character image data and the character code data as shown in FIG. 1 and the user may feel objectionable to the mismatches. (The areas shown in rectangles are those that are cut out as character image data.)

FIG. 2A shows a case in which images of characters with kerning are outputted using a conventional image recognition device, and a marked difference can be seen between the character image data and the character code data.

Kerning is a technique to adjust the distance between two adjacent characters when the adjacent characters are printed as a combination to give them a more spatially balanced feeling. In FIG. 2A, the character code data "e" is arranged close to the right bottom corner of the character image data "W" using the kerning technique. As can be seen from it, a portion of the left side of the character code data "e" is overlapped and hidden behind the character image data "W." FIG. 2B shows a case of outputting the character images expressed in italics using a conventional image recognizing device, in which the differences can also be seen explicitly.

The right bottom corner of the character image "W" expressed in italics contains a left-side portion of the character image "e," which is offset from the character "e" outputted by the character code data. Also, the left top corner of the character image "n" expressed in italics contains a right-side portion of the character image "k," which is offset from the character "k" outputted by the character code data.

SUMMARY OF THE INVENTION

It is an object of the present invention to provide an improved image processing device and a program product to solve the abovementioned problems.

It is a further object of the present invention to provide an improved image processing device and a program product to mitigate the objectionable feeling the user might have toward the mismatch of images when an image is outputted in which the character code data obtained by recognizing character images of image data and the character image data obtained by cutting them out from the character images without converting them into character code data coexist.

According to an aspect of the invention, it is an image processing device comprising: a character recognition unit that recognizes character codes from character images in image data and also detects character recognition certainty, which is a degree of correctly recognizing character codes; a conversion unit that converts the character images to character code data according to the character codes; and a judgment unit that judges whether the character images should be converted to the character code data, wherein said judgment unit judges whether all character images contained in a specific character image group formed as an assembly of multiple adjoining character images should be prohibited from being converted into character code data depending on the character recognition certainty of said character images contained in the character image group.

According to another aspect of the invention, it is a program product for image processing, said program product causing a computer to execute a process comprising the steps of: 1) recognizing character codes from character images contained in image data; 2) detecting character recognition certainty, which is a degree of correctly recognizing character codes in step 1); 3) judging whether all character images contained in a specific character image group formed as an assembly of multiple adjoining character images should be prohibited from being converted into character code data depending on the character recognition certainty of said character images contained in the character image group.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 1 is a drawing illustrating an example wherein character code data and character image data are disposed using a conventional image recognition device;

FIG. 2A and FIG. 2B are drawings illustrating other examples wherein character code data and character image data are disposed using a conventional image recognition device;

DETAILED DESCRIPTION OF THE PREFERRED EMBODIMENT

The embodiments of this invention will be described below with reference to the accompanying drawings.

Figure 3:
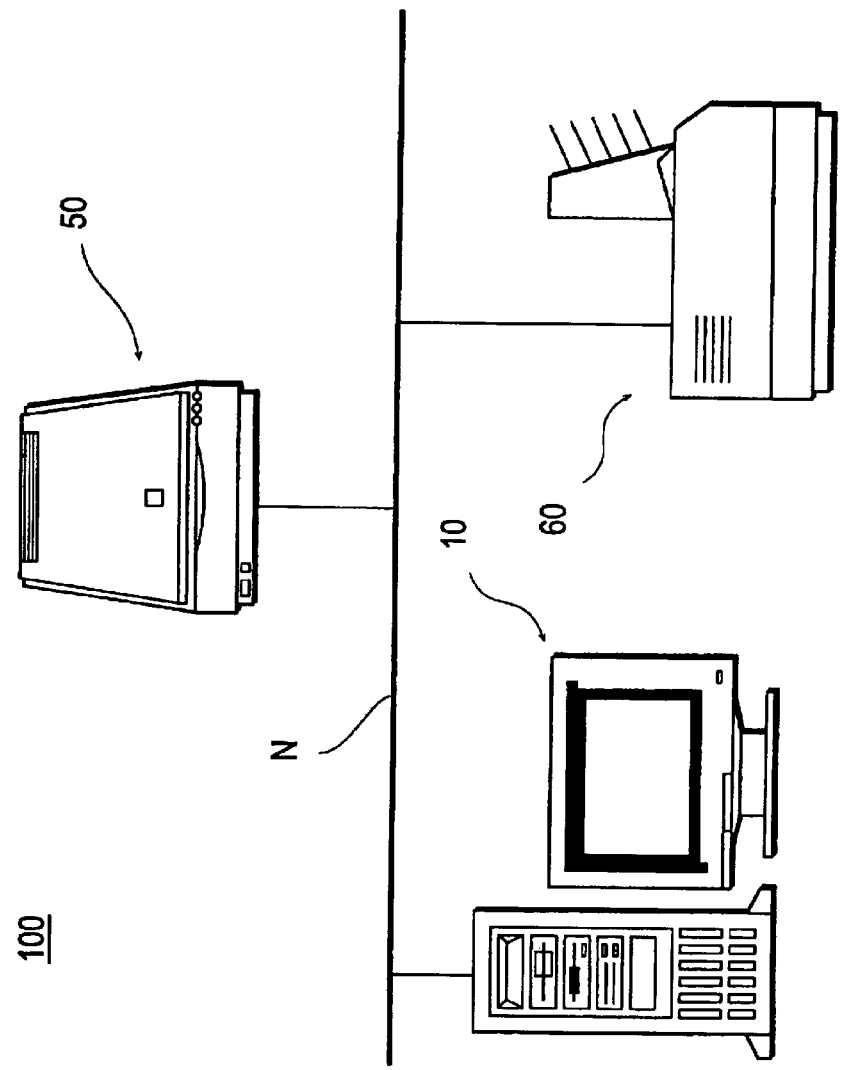
FIG. 3 is a constitutional drawing illustrating an information equipment system including an image processing device according to the first embodiment of the invention.

FIG. 3 is a constitutional drawing illustrating an information equipment system including an image processing device according to the first embodiment of the invention.

An information equipment system 100 consists of information equipment such as a computer 10 capable of functioning as an image processing device, a scanner 50, or an image input device, and a printer 60, or an image output device, all of which are interconnected on a network N.

The computer 10, the scanner 50, and the printer 60 exchange data via the network N.

Figure 4:
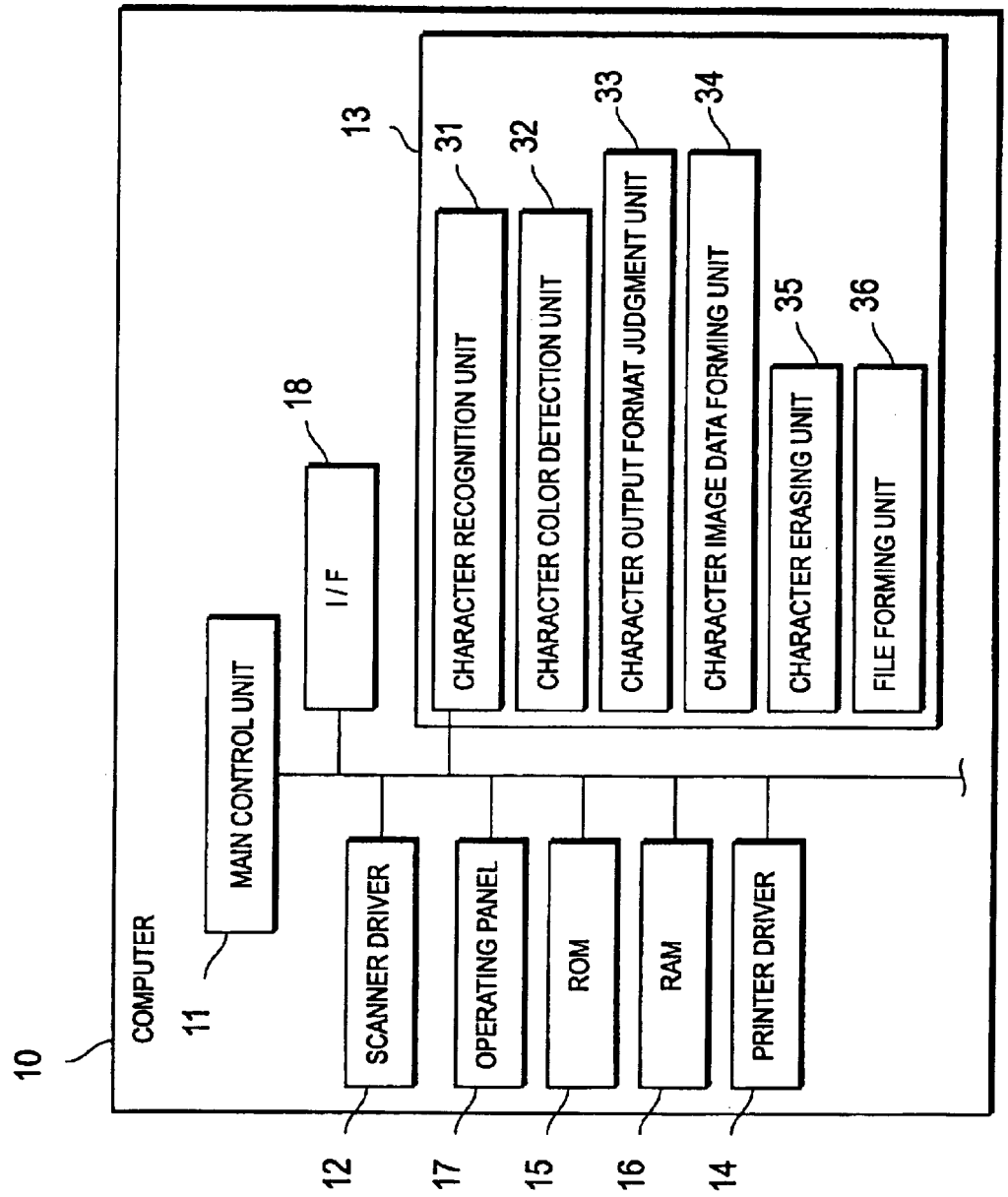
FIG. 4 is a block diagram illustrating the schematic structure of the computer shown in FIG. 3.

FIG. 4 is a block diagram to illustrate the schematic structure of the computer 10.

The computer 10 includes an interface 18 that exchanges data between various information equipment, a scanner driver 12 for controlling the scanner 50, a printer driver 14 for controlling the printer 60, a ROM 15 storing specified programs and data, a RAM 16 that stores data temporarily, an operating panel 17 capable of displaying various information and receiving instruction input from the user, an image processing unit 13 for processing character recognition, etc. (to be described later), and a main control unit 11 that controls various units mentioned above. The scanner driver 12 and the printer driver 14 are software and are stored on a memory device (not shown) such as a hard disk.

The operating instruction for the information equipment system shown in FIG. 3 can be made through the operating panel 17 of the computer 10. The operating panel 17 in this embodiment is a virtual panel displayed on the display unit of the computer 10 and operating instructions are entered by means of operating such devices as the keyboard and the mouse, which are normally used for operating the computer 10.

For example, a scan & file button and a scan & print button are displayed on the operating panel 17. When the scan & file button is operated to instruct an operation, the scanner 50 starts the document reading operation, and the image data obtained by scanning will be transmitted to the computer 10, image-processed by the image processing unit 13, and stored into the memory device of the computer 10 as a file of a prescribed format.

When the scan & print button is operated to instruct an operation, the image data obtained by scanning with the scanner 50 will be image-processed by the image processing unit 13, and will be transmitted to the printer 60 to be printed on paper.

The image processing unit 13 will be described in detail.

The image processing unit 13 includes a character recognition unit 31, a character color recognition unit 32, a character output format judgment unit 33, a character image data forming unit 34, a character erasing unit 35, and a file forming unit 36.

Figure 5:
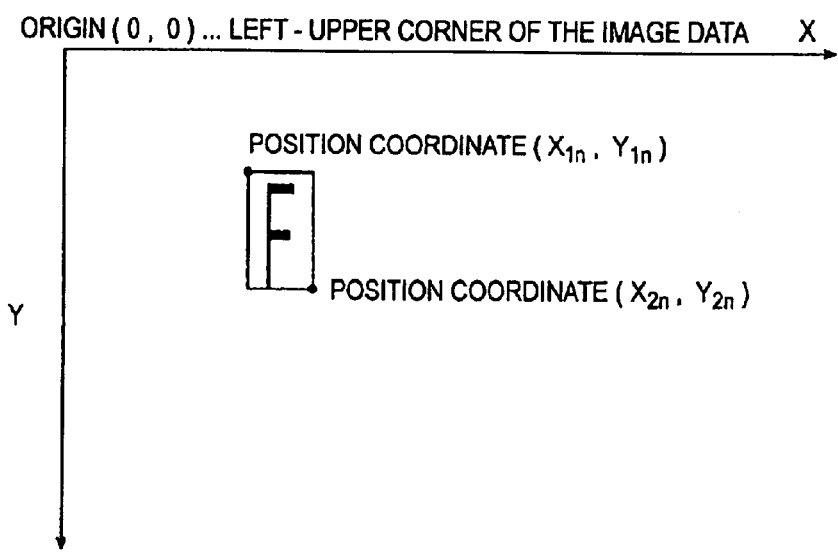
FIG. 5 is a drawing for describing the position information of each character image.

The character recognition unit 31 recognizes character codes from each character image to obtain character code data, and detects character recognition certainty, which is the degree of certainty of character code recognition. The method of recognizing a character code of a character image is done by matching the characteristic amount of each character image with a dictionary pattern which is stored in advance. The character recognition certainty is expressed by a scale of 10, where a larger value means a higher degree of recognition. The character recognition unit 31 recognizes the position information of a character image. The position information of a character image is obtained as the left top and right bottom coordinates of a rectangle that circumscribes the character image with the left top corner of the image data as the origin as shown in FIG. 5. The character recognition unit 31 further recognizes the attributes of a character such as the type and size of its font and the style of the font, e.g., italics. It also identifies a font by classifying it into one of the preselected typical output fonts. The character color detection unit 32 detects the color of each character image once the character code is identified.

The character output format judgment unit 33 makes a judgment whether a character image in image data should be converted into character code data or be cut out to produce character image data without converting it into character code data. The character image data forming unit 34 cuts out a character image that is determined to be made into character image data from the input image data and produces character image data.

The character erasing unit 35 erases the original character image, i.e., the original image that are made into character code data or character image data, from the original image data, i.e., the inputted color image data.

The file forming unit 36 generates a file of a prescribed format using character code data and character image data obtained from character images contained in the inputted image data.

Next, the operation of the image processing unit 13 will be described using the flow charts shown in FIG. 6 and FIG. 7.

First, a conversion in the color space is made from the RGB color system to the Lab color system on the image data obtained by scanning a document by the scanner 50 (S11). The Lab color system is capable of handling data as common color information on the network N without any dependency on any specific information equipment such as scanners and printers.

Next, the OCR preprocessing will be performed in order to form the image data that is to be inputted into the character recognition unit 31 (S12). Because the character recognition unit 31 is going to recognize a character code by means of extracting attributes from the monochromatic binary image data in the later stage, the OCR preprocessing first binarizes the color image data represented by the Lab color system to generate monochromatic binary image data having character images in black and the background image in white. By detecting the L, a and b levels of the character images and the background image, the present embodiment performs the binarization process so that the character codes can be sufficiently recognized from the character images in the image data obtained by scanning the document even if the document contains color characters against a white background or black characters against a color background. In addition to this, the OCR preprocessing performs the removal of noises such as isolated points, the compensation for a case where the document is scanned in a skewed condition, the compensation for character images which are deformed or faint, etc.

The monochromatic binary image data obtained by the OCR preprocessing is inputted into the character recognition unit 31 to have the character recognition processing to be performed on it (S13). The character recognition unit 31 recognizes the character code of each character image in a character area after extracting character areas where character images exist from the monochromatic binary image data. The character recognition unit 31 is also capable of detecting the character recognition certainty, which is the degree of certainty for recognizing character codes, and further recognizes the character's attributes such as the type and size of a font and the style of a font, e.g., italics. Consequently, the character recognition unit 31 outputs various information about individual character image that include the character recognition certainty, position information and character attributes such as the type of font, etc., in addition to the character code data.

Next, the character color detection process will be conducted (S14). In other words, the character color detection unit 32 detects the color of each character image once the character code is recognized. Here, it uses the image data, which has been color converted into the Lab color system. The color detection of the character image is done by reading the values of L, a, and b in the character area, where the character image exists in the image data, and calculating the average values for the L, a, and b values for all the pixels that constitute the character image. The distinction between the pixels of the character image and the background image is done using the monochromatic binary image data obtained in the OCR preprocessing. Thus, it is possible to determine that black pixels in the monochromatic binary image data are the pixels of the character image and white pixels in the same are the pixels of the background image within the circumscribing rectangle of each character image.

In case of outputting a character image after converting it into character code data, the character code data is outputted by specifying a color based on the color information of each character image detected by the character color detection unit 32. This will recreate the character color on the document.

Next, a judgment is made on the output format for a character image in the image data (S15). The character output format judgment unit 33 determines whether a character image in the image data should be converted into character code data or cut out in order to generate character image data without converting it into character code data.

The character output format judgment unit 33 classifies a character image whose character recognition certainty is greater than a prescribed value to be a candidate character image for conversion into character code data, and a character image whose character recognition certainty is less than the prescribed value to be a candidate character image for making character image data. The character output format judgment unit 33 makes a character output format judgment for each character image according to the content of such a candidate if it is not going to perform the special character output format judgment process, which will be described later, within a single word or character image block. In other words, it performs a character output format judgment to output a character image of character code data candidate having a character recognition certainty larger than the prescribed value as character code data, and output a character image of character image data candidate having a character recognition certainty smaller than the prescribed value as character image data.

The character output format judgment unit 33 of the present embodiment looks at a single word or a character image block including a paragraph or the like as a character image group formed by a plurality of character images, detects how many character images exist in it as character image data candidates, whose character recognition certainty is smaller than the prescribe value, and makes a judgment to output character code data and character image data in such a way as not to cause any objectionable feeling to the user as described below.

Figure 7:
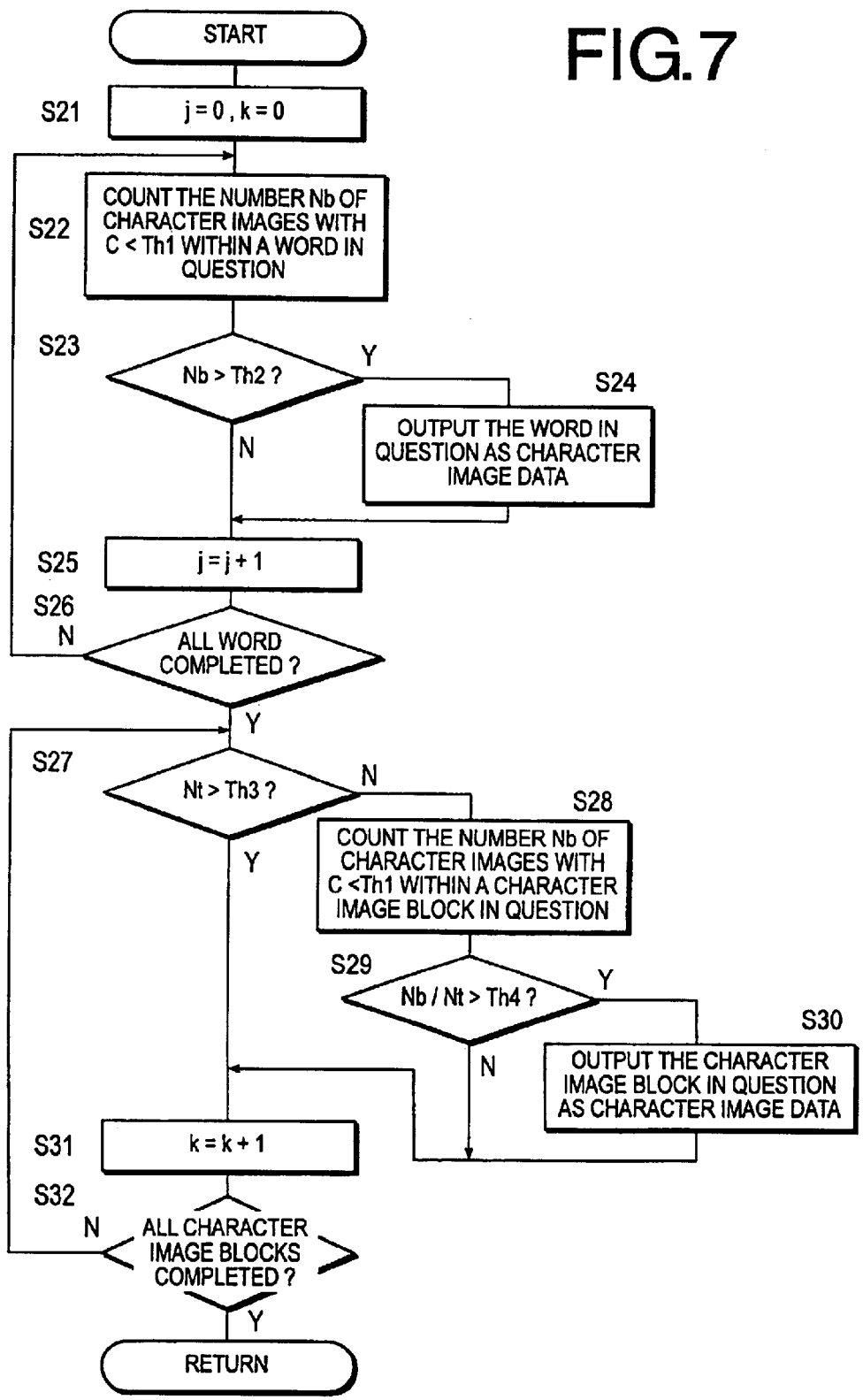
FIG. 7 is a flow chart to illustrate the character output type judgment process shown in FIG. 6.

First, a variable "j" that denotes the sequence number of a word in question and a variable "k" that denotes the sequence number of a character image block in question are initialized as shown in FIG. 7 (S21).

Next, the judgment for the output format for the word in question is initiated. The number of character images having the character recognition certainty C expressed in the scale of 10 is smaller than a prescribed threshold value Th1 is counted among the character images in the word in question, and is called Nb (S22). The threshold value Th1 can be specified arbitrarily.

If the number Nb of the character images that are judged to be character image data candidates among the word in question is greater than a prescribed threshold value Th2 (S23: Yes), it makes a character output format judgment that the entire character images of the word in question should be cut out to form character image data (S24). The threshold value Th2 can be specified arbitrarily so that it is possible to cut out the entire character images to form character image data even if there is only one character image that can be a candidate for the character image data. The threshold value Th2 can be changed according to the total number of the character images in a word. Moreover, it is possible to use the ratio obtained by dividing the number Nb of the character images that are judged to be character image data candidates by the total number of character images in the word as the basis of the judgment instead of using Nb itself as the basis of the judgment.

The variable j that shows the sequence number of the word in question is then incremented by one (S25), and the above process is repeated for all the words in the image data (S26).

Next, the judgment for the output format for the character block in question is initiated. In the present embodiment, a judgment for the special character output format judgment is made only when the total number Nt of character images existing in the character image block is less than a prescribed threshold value Th3 (S27: Yes).

First, similar to the judgment of the character output format for a word in question as described in the above, the number of character images having the character recognition certainty C is smaller than the prescribed threshold value Th1 is counted among the character images in the character image block in question, and is called Nb (S28).

If the ratio Nb/Nt, i.e., the value obtained by dividing the number of the character images that are character image data candidates by the total number Nt of character images in the character image block in question, is greater than a prescribed threshold value Th4 (S29: Yes), it makes a character output format judgment that the entire character images of the character image block in question should be cut out to form character image data (S30). The threshold value Th4 can be specified arbitrarily, e.g., 60%, for example, it can be changed according to the total number Nt of character images in the character image block. Moreover, it is also possible to use the number Nb of character images of the character image data candidates as the basis of the judgment instead of the threshold value Th4 for the ratio Nb/Nt.

On the other hand, if the total number Nt of character images existing in the character image block is greater than the prescribed threshold value Th3 (S27: Yes), a judgment of the special character output format judgment described above will not be performed.

Figure 8:
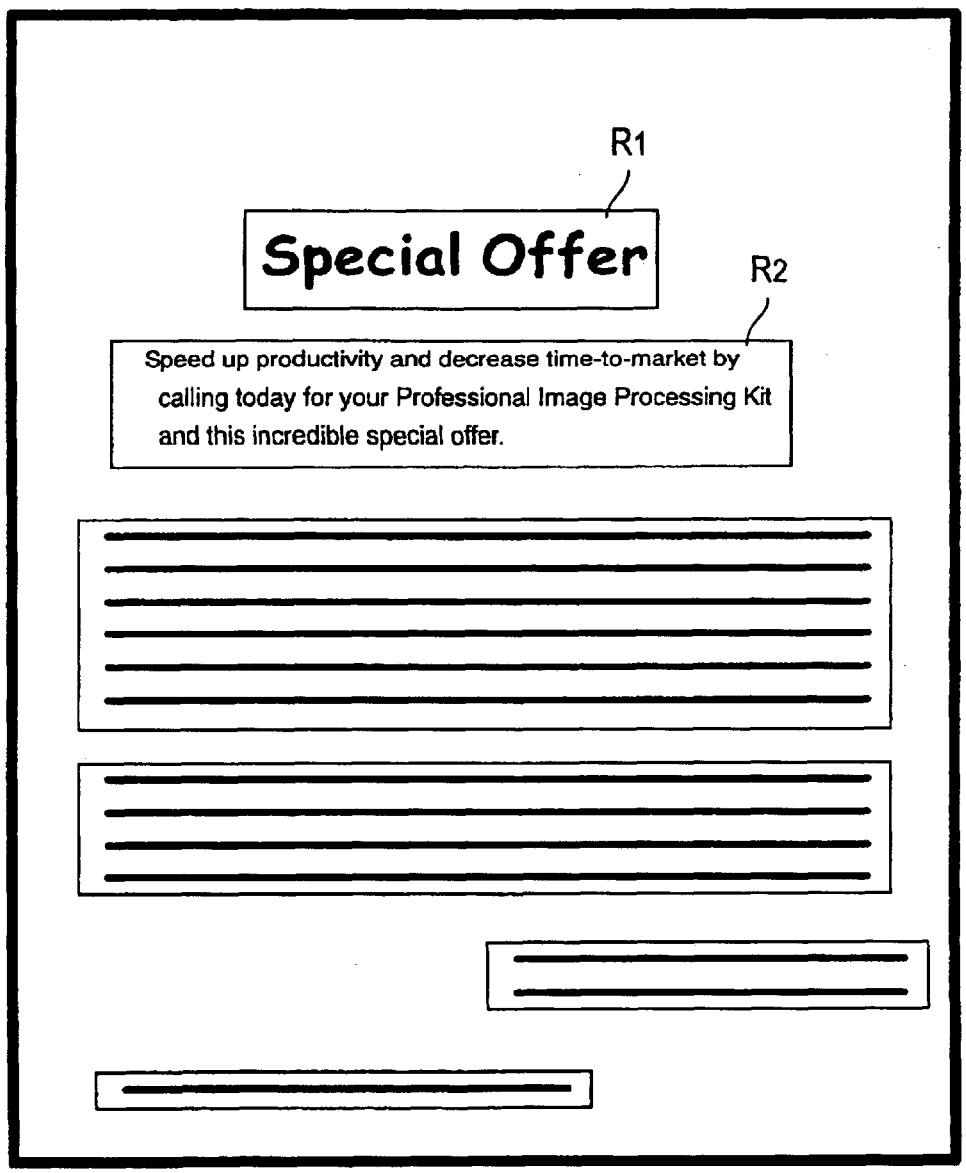
FIG. 8 is a drawing for describing character image blocks.

A character image block is defined in this embodiment as a group of character images such as paragraphs shown in FIG. 8 by rectangular areas R1 and R2. The threshold value Th3 can be arbitrarily set up, for example, it can be set up small so that the character output format judgment can be performed for small image blocks such as a title or a footnote, each of which consists of only a line or two. The application of the character output format judgment to a title provides a great advantage because a difference between fonts is highly conspicuous in the case that the title is output as a mixture of character image data and the character code data as it is not rare to use various fonts for titles. Also, if an unusual font is used, the character recognition certainty generally drops, so that the character images in the image data tend to be outputted as character image data without being converted into character code data if the font used in the document is different from the popular fonts assumed in the character code recognition.

The variable k that indicates the sequence number of the character image block in question is then incremented by one (S31), and the above process is repeated for all the character image blocks in the image data (S32).

Figure 6:
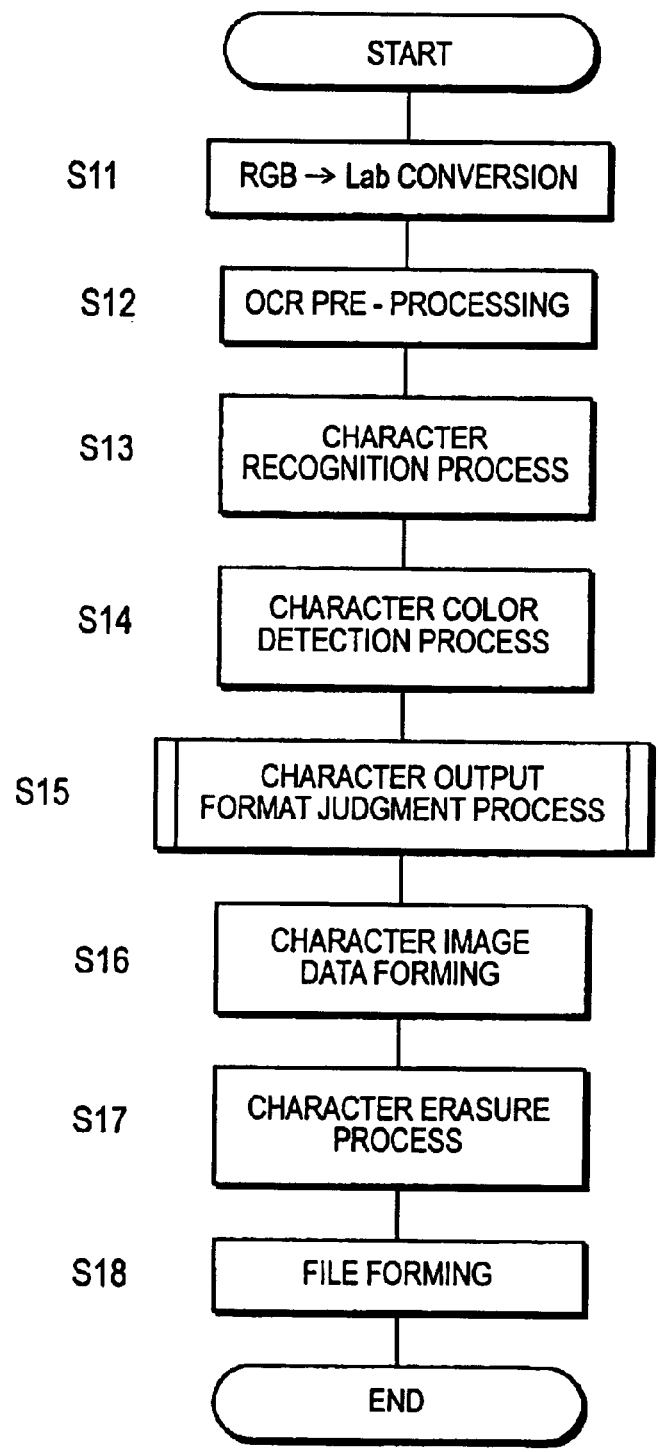
FIG. 6 is a flow chart to illustrate the image processing.

When the character output format judgment process is completed for the character images contained in the image data, it goes back to the main flow chart shown in FIG. 6 and the formation of the character image data is performed (S16). In other words, the character images of the image data are cut out according to the position information outputted from the character recognition unit 31 to form character image data. At this time, the image data within the circumscribing rectangle area for each character image is cut out. In case of cutting out a group of continuous row of character images such as to cut out the entire character images within a word or a character image block to form character image data, however, image data of a rectangular area containing the entire character images within a word specified by (Min $(X_{1n})$, Min $(Y_{1n})$) and (Max $(X_{2n})$, Max $(Y_{2n})$), where $(X_{1n}, Y_{1n})$ and $(X_{2n}, Y_{2n})$ are the position information of the n-th character image, i.e., the left top and right bottom coordinates of the circumscribing rectangle.

The reason that the character image to be outputted as the character image data is cut out, for example, by the word without leaving it in its original position as the image data obtained by scanning the document, is so that the character code data and the character image data do not overlap each other. In general, the input font and the output font seldom match with each other, so that the position character code data converted from a character image is disposed will be slightly off the position of said character image within the input image data. As a result, if a character image is left as image data in its original position without cutting it out as a character image or as a word and its character code data is disposed as is, it can cause a problem that the character code data overlaps with the character image in the original image data obtained by scanning the document. Therefore, the present embodiment cuts out each character image, or each word, to produce character image data and disposes the cutout character image data in succession to the place where the character code data is disposed with the output font.

Next, it performs the character erasure process (S17). After obtaining character code data or character image data from a character image, the character erasing unit 35 erases the original character image, from which the character code data or the character image data has been obtained, from the color image data obtained by scanning the document.

Figure 9C:
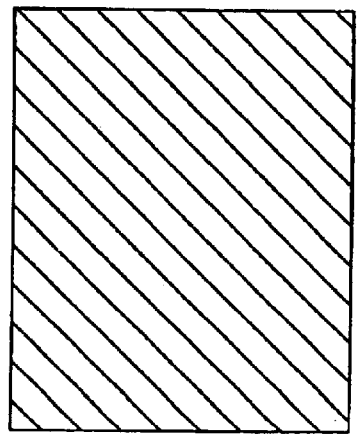
FIG. 9A through FIG. 9C are drawings for describing the character erasing process.
Figure 9B:
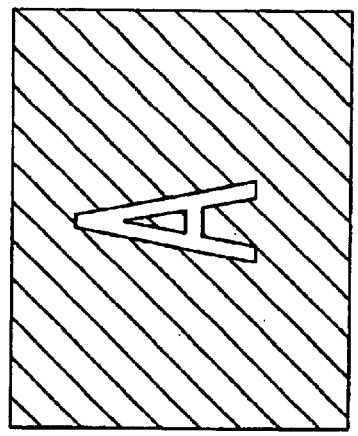
Figure 9A:
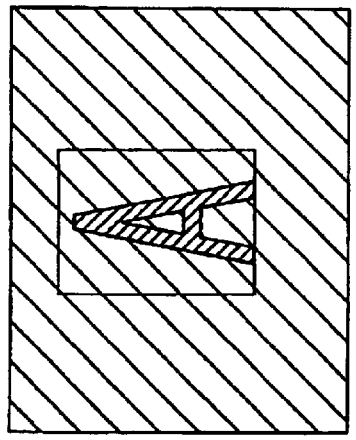

FIG. 9A through FIG. 9C are the drawings to describe the character erasure process. As shown in the drawings, a portion of the image data within the circumscribing rectangle of an individual character image (FIG. 9A) that corresponds to the character image is erased temporarily (FIG. 9B), and is complimented by the surrounding image data (FIG. 9C). The portion to be erased can be obtained by a process of expanding the black area of a monochromatic binary image data by two to three pixels in the circumscribing rectangle of said character image. The image data remaining after removing the portion that corresponds to the character image from the original image data obtained by scanning the document still holds image data other than the character image, i.e., images such as a photograph and a line drawing, or a background image as shown in FIG. 9B.

Figure 10:
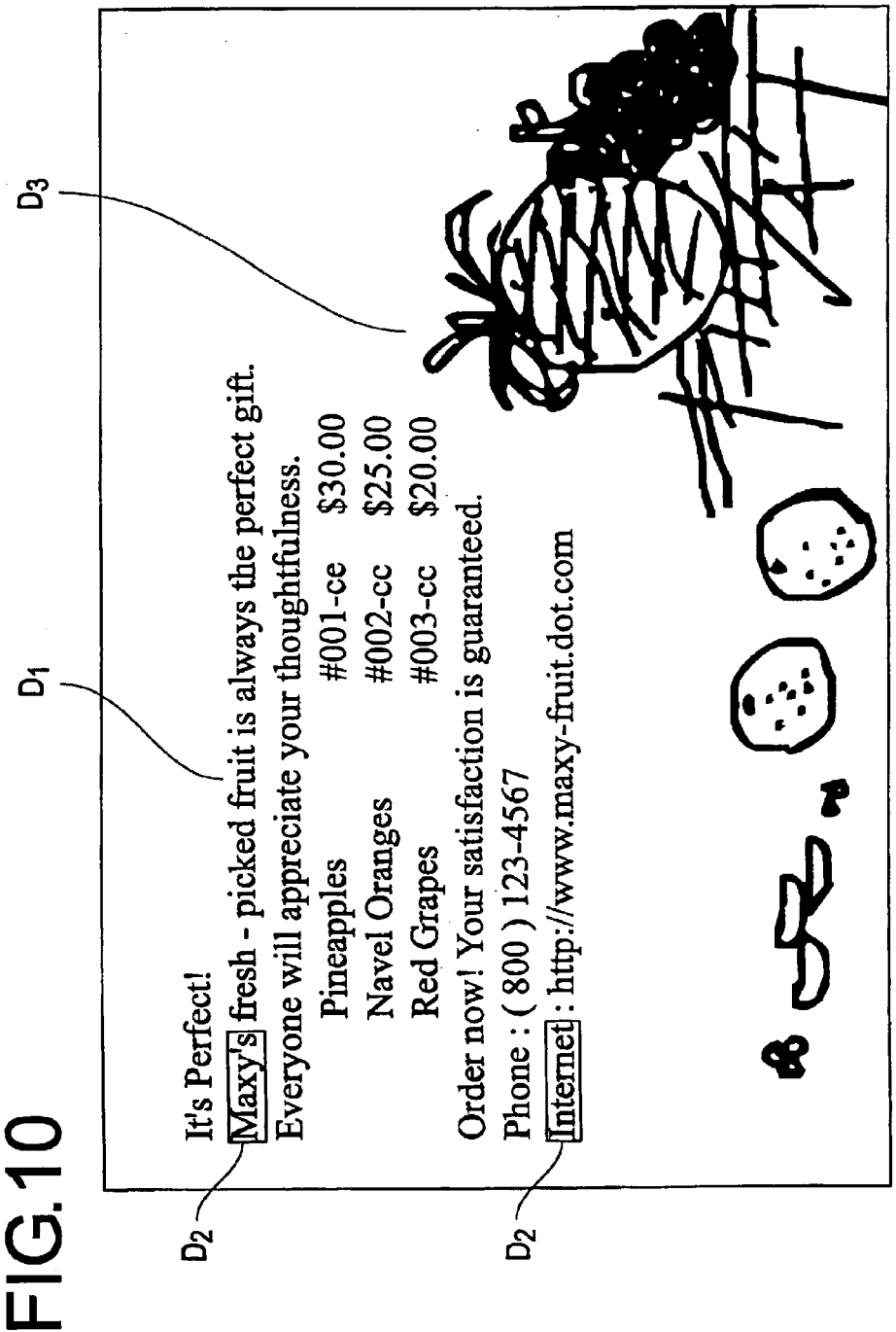
FIG. 10 is a drawing wherein character code data, character image data, and graphic images that are non-character images and are left as they are.

By performing the abovementioned processes, as an example, character code data D1 and character image data D2 are obtained from the character image within the image data, and image data D3 that is still holding graphic images that are non-character images are also obtained shown in FIG. 10.

These character code data, character image data, and the image data are disposed in the page in a prescribed file format and stored (S18). If the scan & print button is selected, the specified data will be transmitted to the printer 60 and printed on paper.

Thus, the present embodiment makes it possible to dispose the character code data and the character image data together more naturally in such a way as to minimize the mismatches in their positions and fonts so as to minimize the user's objectionable feeling.

Figure 11:
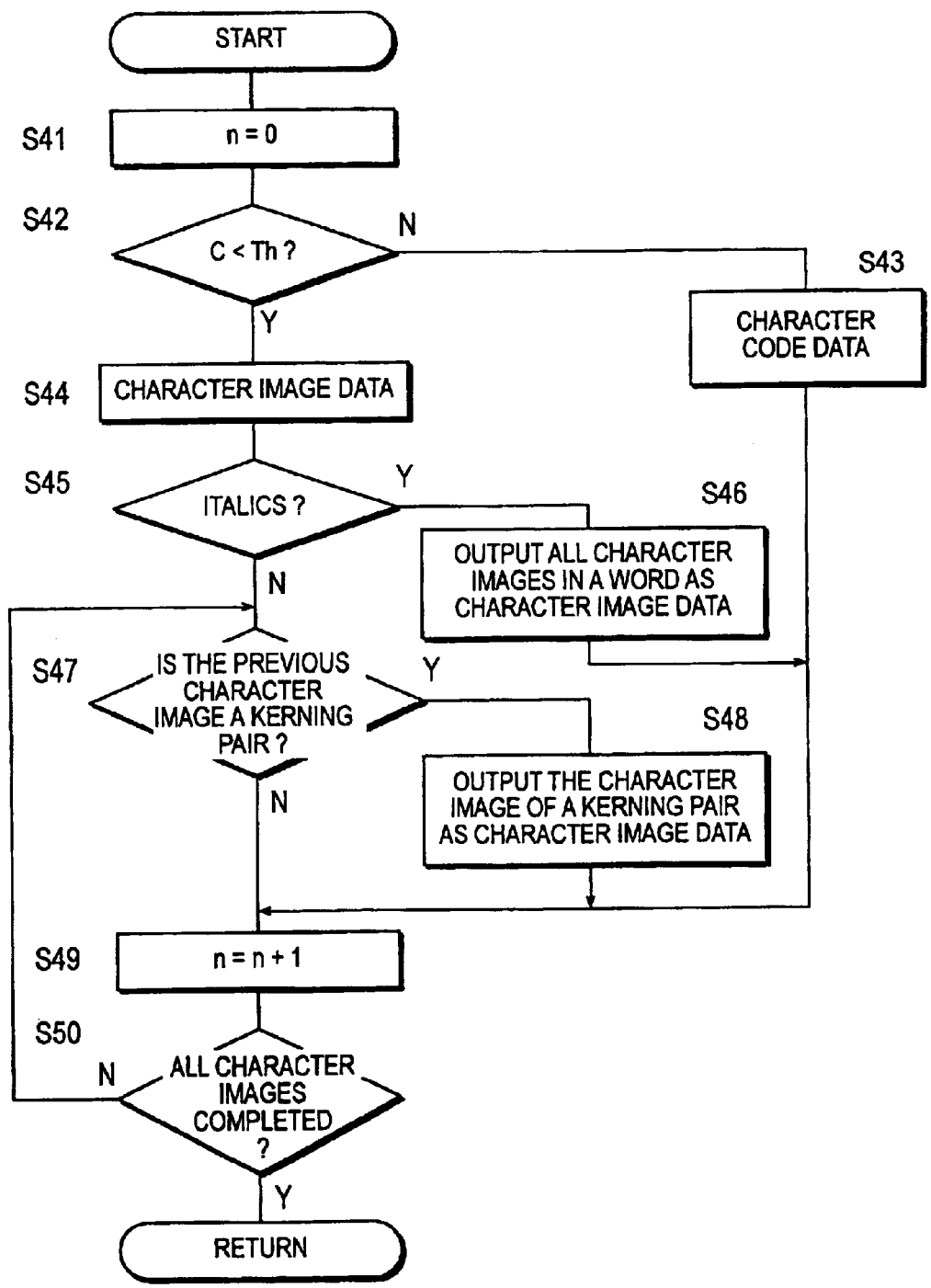
FIG. 11 is a flowchart of the character output format judgment process for an image processing device according to the second embodiment of the invention.

FIG. 11 is a subroutine flow chart to illustrate the character output format judgment process of the image processing device according to the second embodiment of the invention.

The second embodiment is different from the first embodiment in the contents (refer to FIG. 7) of the character output format judgment process (S15 of FIG. 6). The image processing of the second embodiment, in particular, to its difference from the first embodiment will be described in the following.

After the color space conversion (S11), the OCR preprocessing (S12), the character recognition process (S13), and the character color detection processing (S14) as shown in FIG. 6 have been performed as in the first embodiment on image data obtained by reading the document with the scanner 50, the judgment process of the character output format will be performed on character images in the image data (S15). A judgment is made by the character output format judgment unit 33 whether the character images in the image data should be converted into character code data or cut out to generate character image data without converting them into character code data.

The character output format judgment unit 33 of this embodiment checks every character images and detects whether there is any specific character image exists, whose character recognition certainty is smaller than a prescribed value, and a straight line that passes through the edge of said character image in the direction character images are aligned and is perpendicular to said direction intersects with an adjacent character image, so that character code data and character image data can be outputted without causing any objectionable feelings as described below.

First, it initializes a variable "n" that represents the sequence number of a character image in question as shown in FIG. 11 (S41).

Next, it makes a judgment whether the character recognition certainty C of the character image in question is smaller than a specified threshold value Th (S42). The character output format judgment unit 33 determines that if the character recognition certainty C of a character image is larger than the specified threshold value Th, the character image is a candidate for conversion to character code data, and if the character recognition certainty C is smaller than the specified threshold value Th, it is a candidate for forming of character image data. The character output format judgment unit 33 makes a character output format judgment for each character image according to the content of such a candidate if it is not going to perform the special output format judgment process for an italic character image or a character image to which kerning is applied, which will be described later. In other words, it performs a character output format judgment to output a character image of character code data candidate having a character recognition certainty C larger than the prescribed value Th as character code data, and output a character image of character image data candidate having a character recognition certainty C smaller than the prescribed value Th as character image data (S43, S44). The threshold value Th1 can be set up arbitrarily.

Although the character output format judgment unit 33 basically makes a character output format judgment according to the content of said candidate for each character image, a problem occurs if the same judgment is applied to an italic character image or a character image where kerning is applied, wherein a straight line that passes through the edge of a character image in the direction character images are aligned and is perpendicular to said direction intersects with an adjacent character image. In other words, a character printed based on character code data and a character printed based on character image data are duplicated in one area of a character printed on paper, or a portion of a character printed based on character code data is overwritten by a character printed based on character image data causing an offset at the juncture. Therefore, this embodiment checks whether a character image is an italic character image or a kerning character image after making a judgment as to whether the character image is a character code data candidate or a character image data candidate, in order to make a judgment on a proper character output format.

If the character recognition certainty C of a character image in question is smaller than the specified threshold value Th, a judgment is made whether said character image is in italics (S45). Character attribute information on whether said character image is in italics is recognized by the character recognition unit 31, and is stored as the character attribute information for each character image. If said character image is in italics (S45: Yes), an output format judgment will be made to cut out the entire character images within a word as a group of character images that contain said italic character image to generate character image data (S46).

Next, a judgment is made whether the character image in question is forming a pair with the character image in front of it to which kerning is applied (S47). The pairs of character images to which kerning is applied are stored as data in advance and include WA, VA, We, etc. A judgment that a kerning pair (a pair to which kerning technique is applied) is formed includes not only a case where each character image of the pair owns position information of the circumscribing rectangle and a process of narrowing the gap between them is performed, but also a case that the gap between the two character images forming a pair is narrowed in advance and they own position information of a single, united circumscribing rectangle. It can also be arranged to make a judgment whether the character image in question forms a kerning pair with a character image behind it or character images both before and after it.

If the character image in question forms a kerning pair with a character image before it (S47: Yes), it makes an output format judgment to cut out both image characters that form a kerning pair as a group of character images to form character image data (S48). In this case (S47: Yes), it is possible to make an output format judgment to cut out the entire character images within a word that contains a kerning pair to form character image data.

The variable n that shows the sequence number of the character image in question is then incremented by one (S49), and the above process is repeated for all the character images in the image data (S50).

When the character output format judgment process is completed for individual character images in the image data, it returns to the main flow chart shown in FIG. 6 to form character image data(S16). Character images in the image data are cut out to form character image data according to the position information outputted by the character recognition unit 31 (refer to FIG. 5).

At this time, the image data of the circumscribing rectangular area for each character image is cutout. However, the process of cutting out a group of continuous row of character images such as to cut out the entire character images within a word or two character images that form a kerning pair together is done as follows.

Figure 12:
FIG. 12 is a drawing illustrating an example wherein image data of a rectangular area containing an overall italic character image within a word is cut out.

When the character image is in italics as shown in FIG. 12, it cuts out the image data of a rectangular area that contains all the character images within a word specified by (Min $(X_{1n})$, Min $(Y_{1n})$) and (Max $(X_{2n})$, Max $(Y_{2n})$), where $(X_{1n}, Y_{1n})$ and $(X_{2n}, Y_{2n})$ are the position information of the n-th character image within a word containing the italic character image, i.e., the left top and right bottom coordinates of the circumscribing rectangle.

Figure 13:
FIG. 13 is a drawing illustrating an example wherein image data of a rectangular area containing a pair of character images processed by kerning is cut out.

When character images form a kerning pair as shown in FIG. 13, it cuts out the image data of a rectangular area specified by $(X_{1n}, Y_{1n})$ and $(X_{2n+1}, Y_{2n+1})$, where $(X_{1n}, Y_{1n})$ and $(X_{2n}, Y_{2n})$ are the position information of the front character image, i.e., the left top and right bottom coordinates of the circumscribing rectangle, and $(X_{1n+1}, Y_{1n+1})$ and $(X_{2n+1}, Y_{2n+1})$ are the position information of the rear character image.

The reason that character images that are outputted as character image data are cut out, for example, by the word, without leaving them in their original positions of the image data obtained by scanning the document, is so that the character code data and the character image data do not overlap as mentioned before.

Next, the character erasure process (S17) and the file forming (S18) in the specified format are performed as in the first embodiment. If the scan & print button is selected, the specified data will be transmitted to the printer 60 to be printed on paper.

Thus, the present embodiment can naturally dispose both character code data and character image data without causing any double writing or offsets at the connecting lines and reduce any objectionable feelings to the user.

It is obvious that this invention is not limited to the particular embodiments shown and described above but may be variously changed and modified without departing from the technical concept of the invention.

For example, although it was described in the above embodiments to convert the color space of the input image data from the RGB color system to the Lab color system in the image processing, it is also possible to conduct the image processing using other color space such as the RGB color system of the image data obtained by scanning the document with the scanner 50.

Furthermore, although it was described in the above embodiments that the character output format judgment unit 33 uses the character recognition certainty as the criterion to determine whether the character image in question is a candidate for character code data conversion, it is also possible to use the degree of character-suggestive nature (character continuity) obtained from the position information and color information of the character image for the same purpose.

Furthermore, although it was described in the above embodiments that, in determining to cut out the entire character images within the word in question or the character image block, the number Nb of the character images, whose character recognition certainties are smaller than a prescribed value, for example, within the word in question, it is also possible to use the average of the character recognition certainties of all the character images within the word in question. In other words, it is possible to cut out the entire character images within the word in question to form character image data when the average of the character recognition certainties is smaller than the prescribed value.

Furthermore, although it was described in the above embodiments using a computer as an example of the image processing device, the image processing device of the present invention is not limited to it. The invention can be applied to a scanner that performs the processes described above and transmits the result to a computer or a printer, a printer that receives image data directly from the scanner and performs the processes described above, or a color digital copying machine that performs all the processes from scanning of a document to printing on paper.

The control of the image processing in the embodiments described above is performed by the main control unit 11 as it executes a specified program, which contains the processing sequence mentioned above (refer to FIG. 6 and FIG. 7), and this program can be provided also by means of computer readable recording medium (e.g., floppy disk, CD-ROM). The specified program can be provided either as an application software program, or can be built into information equipment such as a computer, digital copying machine, scanner and printer as a function of them, or the control server as a part of their functions. In the present invention, a computer program product includes a program itself and a computer readable recording medium that contains the program.

What is claimed is:

1. An image processing device comprising:
    a character recognition unit that recognizes character codes from character images in image data and also detects character recognition certainties, which are respectively degrees of correctly recognizing the character codes;
    a conversion unit that converts the character images to character code data according to the character codes; and
    a judgment unit that judges whether the character images should be converted to the character code data, wherein said judgment unit judge whether all character images contained in a specific character image group formed as an assembly of multiple adjoining character images should be prohibited from being converted into character code data depending on at least one of the character recognition certainties of said character images contained in the character image group.

2. An image processing device of claim 1, wherein said judgment unit judges that all character images contained in said character image group should be prohibited from being converted into character code data if the number of character images contained in said character image group, whose character recognition certainties are smaller than a first prescribed value, is larger than a second prescribed value.

3. An image processing device of claim 1, wherein said judgment unit judges that all character images contained in said character image group should be prohibited from being converted into character code data if the ratio of the number of character images contained in the character image group, whose character recognition certainties are smaller than first prescribed value, against the total number of character images contained in said character image group is larger than a second prescribed value.

4. An image processing device of claim 1, wherein said judgment unit judges that all character images contained in said character image group should be prohibited from being converted into character code data if the average of character recognition certainties of all character images contained in said character image group is smaller than a prescribed value.

5. An image processing device of claim 1, wherein said judgment unit judges that all character images contained in said character image group should be prohibited from being converted into character code data if the character recognition certainty of at least one of the character images contained in said character image group is smaller than a first prescribed value and said at least one character image is in italics.

6. An image processing device of claim 5, wherein said judgment unit judges that a character image is in italics if straight line that passes through an edge of said character image in a direction character images are aligned and is perpendicular to said direction intersects with an adjacent character image.

7. An image processing device of claim 1, wherein said judgment unit judges that all character images contained in said character image group should be prohibited from being converted into character code data if the character recognition certainty of at least one of the character images contained in said character image group is smaller than a first prescribed value and said at least one character image also forms a pair as an object for kerning with a character image adjacent to said at least one character image.

8. An image processing device of claim 7, wherein said character image group consists only of multiple character images that form pairs for kerning.

9. An image processing device of claim 1, further comprising a character image data forming unit that forms character image data by cutting out from said image data the character images that are prohibited from being converted into character code data by said judgment unit.

10. An image processing device of claim 1, further comprising a file forming unit to form an electronic file containing character code data generated by said conversion unit.

11. A program product for image processing in a computer-readable medium, said program product causing a computer to execute a process comprising the steps of:
1) recognizing character codes from character images contained in image data;
2) detecting character recognition certainties, which are respectively degrees of correctly recognizing the character codes in step 1); and
3) judging whether all character images contained in a specific character image group formed as an assembly of multiple adjoining character images should be prohibited from being converted into character code data depending on at least one of the character recognition certainties of said character images contained in the character image group.

12. A program product of claim 11, wherein it is judged at said step 3) that all character images contained in said character image group should be prohibited from being converted into character code data if the number of character images contained in said character image group, whose character recognition certainties are smaller than a first prescribed value, is larger than a second prescribed value.

13. A program product of claim 11, wherein it is judged at said step 3) that all character images contained in said character image group should be prohibited from being converted into character code data if the ratio of the number of character images contained in the character image group, whose character recognition certainties are smaller than a first prescribed value, against the total number of character images contained in said character image group is larger than a second prescribed value.

14. A program product of claim 11, wherein it is judged at said step 3) that all character images contained in said character image group should be prohibited from being converted into character code data if the average of character recognition certainties of all character images contained in said character image group is smaller than a prescribed value.

15. A program product of claim 11, wherein it is judged at said step 3) that all character images contained in said character image group should be prohibited from being converted into character code data if the character recognition certainty of at least one of the character images contained in said character image group is smaller than a first prescribed value and said at least one character image is in italics.

16. A program product of claim 15, wherein it is judged at said step 3) that a character image is in italics if a straight line that passes through an edge of said character image in a direction character image are aligned and is perpendicular to said direction intersects with an adjacent character image.

17. A program product of claim 11, wherein it is judged at said step 3) that all character images contained in said character image group should be prohibited from being converted into character code data if the character recognition certainty of at least one of the character images contained in said character image group is smaller than a first prescribed value and said at least one character image also forms a pair as an object for kerning with a character image adjacent to said at least one character image.

18. A program product of claim 17, wherein said character image group consists only of multiple character images that form pairs for kerning.

19. A program product of claim 11, wherein said process further comprising the step of 4) forming character image data by cutting out from said image data the character images that are prohibited from being converted into character code data in said step 3).

20. A program product of claim 11, wherein said process further comprising the step of 5) forming an electronic file containing character code data converted from said character images.

21. An image processing method, comprising:
1) recognizing character codes from character images contains in image data;
2) detecting character recognition certainties, which are respectively degrees of correctly recognizing the character codes in step 1); and
3) judging whether all character images contained in a specific character image group formed as an assembly of multiple adjoining character images should be prohibited from being converted into character code data depending on at least one of the character recognition certainties of said character images contained in the character image group.

22. The method of claim 21, wherein it is judged at said step 3) that all character images contained in said character image group should be prohibited from being converted into character code data if the number of character images contained in said character image group, whose character recognition certainties are smaller than a first prescribed value, is larger than a second prescribed value.

23. The method of claim 21, wherein it is judged at said step 3) that all character images contained in said character image group should be prohibited from being converted into character code data if the ratio of the number of character images contained in the character image group, whose character recognition certainties are smaller than a first prescribed value, against the total number of character images contained in said character image group is larger than a second prescribed value.

24. The method of claim 21, wherein it is judged at said step 3) that all character images contained in said character image group should be prohibited from being converted into character code data if the average of character recognition certainties of all character images contained in said character image group is smaller than a prescribed value.

25. The method of claim 21, wherein it is judged at said step 3) that all character images contained in said character image group should be prohibited from being converted into character code data if the character recognition certainty of at least one of the character images contained in said character image group is smaller than a first prescribed value and said at least one character image is in italics.

26. The method of claim 25, wherein it is judged at said step 3) that a character image is in italics if a straight line that passes through an edge of said character image in a direction character image are aligned and is perpendicular to said direction intersects with an adjacent character image.

27. The method of claim 21, wherein it is judged at said step 3) that all character images contained in said character image group should be prohibited from being converted into character code data if the character recognition certainty of at least one of the character images contained in said character image group is smaller than a first prescribed value and said at least one character image also forms a pair as an object for kerning with a character image adjacent to said at least one character image.

28. The method of claim 27, wherein said character image group consists only of multiple character images that form pairs for kerning.

29. The method of claim 21, wherein said process further comprising the step of 4) forming character image data by cutting out from said image data the character images that are prohibited from being converted into character code data in said step 3).

30. The method of claim 21, wherein said process further comprising the step of 5) forming an electronic file containing character code data converted from said character images.

31. An image processing device comprising:
  a character recognition unit that recognizes character codes from character images in image data and also detects character recognition certainties, which are respectively degrees of correctly recognizing the character codes;
  a conversion unit that converts the character images to character code data according to the character codes; and
  a judgment unit that judges whether all character images contained in a specific character image group formed as an assembly of multiple adjoining character images should be at least in a form of image data depending on at least one of the character recognition certainties of said character images contained in the character image group.

32. The image processing device of claim 31, wherein said judgment unit judges that all character images contained in said character image group should be at least in the form of image data if at least one of the following conditions (1) through (5) is satisfied:
  (1) the number of character images contained in said character image group, whose character recognition certainties are smaller than a first prescribed value, is larger than a second prescribed value;
  (2) the ratio of the number of character images contained in the character image group, whose character recognition certainties are smaller than third prescribed value, against the total number of character images contained in said character image group is larger than a fourth prescribed value;
  (3) the average of character recognition certainties of all character images contained in said character image group is smaller than a fifth prescribed value;
  (4) the character recognition certainty of at least one of the character images contained in said character image group is smaller than a sixth prescribed value and said at least one character image is in italics; and
  (5) the character recognition certainty of at least one of the character images contained in said character image group is smaller than a seventh prescribed value and said at least one character image also forms a pair as an object for kerning with a character image adjacent to said at least one character image.

33. The image processing device of claim 32, wherein, in a case of the condition (4), said judgment unit judges that a character image is in italics if a straight line that passes through an edge of said character image in a direction character images are aligned and is perpendicular to said direction intersects with an adjacent character image.

34. The image processing device of claim 32, wherein in a case of the condition (5), said character image group consists only of multiple character images that form pairs for kerning.

35. The image processing device of claim 31, further comprising a character image data forming unit that forms character image data by cutting out from said image data the character images that are judged to be at least in the form of image data by said judgment unit.

36. The image processing device of claim 31, further comprising a file forming unit to form an electronic file containing character code data generated by said conversion unit.

37. A program product for image processing in a computer-readable medium, said program product causing a computer to execute a process comprising the steps of:
  (1) recognizing character codes from character images contained in image data;
  (2) detecting character recognition certainties, which are respectively degrees of correctly recognizing the character codes in step 1);
  (3) judging whether all character images contained in a specific character image group formed as an assembly of multiple adjoining character images should be at least in a form of image data depending on at least one of the character recognition certainties of said character images contained in the character image group.

38. The program product of claim 37, wherein
  it is judged at said step (3) that all character images contained in said character image group should be at least in the form of image data if at least one of the following conditions (1) through (5) is satisfied:
  (1) the number of character images contained in said character image group, whose character recognition certainties are smaller than a first prescribed value, is larger than a second prescribed value;
  (2) the ratio of the number of character images contained in the character image group, whose character recognition certainties are smaller than third prescribed value, against the total number of character images contained in said character image group is larger than a fourth prescribed value;
  (3) the average of character recognition certainties of all character images contained in said character image group is smaller than a fifth prescribe value;
  (4) the character recognition certainty of at least one of the character images contained in said character image group is smaller than a sixth prescribed value and said at least one character image is in italics; and
  (5) the character recognition certainty of at least one of the character images contained in said character image group is smaller than a seventh prescribed value and said at least one character image also forms a pair as an object for kerning with a character image adjacent to said at least one character image.

39. The program product of claim 38, wherein in a case of the condition (4), it is judged at said step (3) that a character image is in italics if a straight line that passes through an edge of said character image in a direction character images are aligned and is perpendicular to said direction intersects with an adjacent character image.

40. The program product of claim 38, wherein, in a case of the condition (5), said character image group consists only of multiple character images that form pairs for kerning.

41. The program product of claim 37, wherein said process further comprising the step of 4) forming character image data by cutting out from said image data the character images that are judged to be at least in the form of image data in said step 3).

42. The program product of claim 37, wherein said process further comprising the step of 4) forming an electronic file containing code data converted from said character images.

43. An image processing method, comprising:
  1) recognizing character codes from character images contained in image data;
  2) detecting character recognition certainties, which are respectively degrees of correctly recognizing the character codes in step 1);

3) judging whether all character images contained in a specific character image group formed as an assembly of multiple adjoining character images should be at least in a form of image data depending on at least one of the character recognition certainties of said character images contained in the character image group.

44. The method of claim 43, wherein:

it is judged at step 3) that all character images contained in said character image group should be at least in the form of image data if at least one of the following conditions (1) through (5) is satisfied:

(1) the number of character images contained in said character image group, whose character recognition certainties are smaller than a first prescribed value, is larger than a second prescribed value;

(2) the ratio of the number of character images contained in the character image group, whose character recognition certainties are smaller than third prescribed value, against the total number of character images contained in said character image group is larger than a fourth prescribed value;

(3) the average of character recognition certainties of all character images contained in said character image group is smaller than a fifth prescribed value;

(4) the character recognition certainty of at least one of the character images contained in said character image group is smaller than a sixth prescribed value and said at least one character image is in italics; and (5) the character recognition certainty of at least one of the character images contained in said character image group is smaller than a seventh prescribed value and said at least one character image also forms a pair as an object for kerning value and said at least one character image also forms a pair as an object for kerning with a character image adjacent to said at least one character image.

45. The method of claim 44, wherein, in a case of the condition (4), it is judged at said step 3) that a character image is in italics if a straight line that passes through an edge of said character image in a direction character images are aligned and is perpendicular to said direction intersects with an adjacent character image.

46. The method of claim 44, wherein, in a case of the condition (5), said character image group consists only of multiple character images that form pairs for kerning.

47. The method of claim 43, wherein said process further comprising the step of 4) forming character image data by cutting out from said image data the character images that are judged to be at least in the form of image data in said step 3).

48. The method of claim 43, wherein said process further comprising the step of 4) forming an electronic file containing character code data converted from said character images.

* * * * *